United States Patent
Lipsie

[15] 3,654,042
[45] Apr. 4, 1972

[54] METHOD AND APPARATUS FOR ROLL PRESSURE BONDING

[72] Inventor: Paul C. Lipsie, Apollo, Pa.
[73] Assignee: Allegheny Ludlum Steel Corporation, Pittsburgh, Pa.
[22] Filed: Jan. 2, 1970
[21] Appl. No.: 175

[52] U.S. Cl..............................156/582, 156/555, 156/178
[51] Int. Cl..............................................B32b 31/20
[58] Field of Search..............156/582, 554, 555, 360, 361, 156/178

[56] References Cited

UNITED STATES PATENTS

| | | | |
|---|---|---|---|
| 3,239,396 | 3/1966 | Bohannon, Jr. | 156/555 X |
| 3,397,104 | 8/1968 | Hasselquist | 156/582 X |
| 3,206,349 | 9/1965 | Boyle | 156/554 X |

*Primary Examiner*—Benjamin A. Borchelt
*Assistant Examiner*—J. J. Devitt
*Attorney*—Richard A. Speer, Vincent G. Gioia and Howard R. Berkenstock, Jr.

[57] ABSTRACT

A method and apparatus for roll pressure bonding a plurality of spaced apart stripes to a substrate, which insures accurate alignment of the striping material by employing striping material guides which laterally move from side to side with the substrate.

18 Claims, 4 Drawing Figures

Patented April 4, 1972

INVENTOR.
PAUL C. LIPSIE

By
Attorney

Patented April 4, 1972

INVENTOR.
PAUL C. LIPSIE

By Vincent G. Gioia
Attorney

METHOD AND APPARATUS FOR ROLL PRESSURE BONDING

The application relates to a method and apparatus for pressure bonding a plurality of spaced-apart stripes to a substrate and more particularly to a method and apparatus for pressure bonding a plurality of spaced-apart aligned stripes to a substrate.

Stainless steel is known to serve a particularly good purpose in those applications where brightness and stain resistance to a variety of contaminants is required and is ideally suited for use as automotive trim. However, since most automotive bodies are constructed of carbon steel, the use of stainless steel can result in galvanic corrosion. Carbon steel is anodic to stainless steel and generally corrodes in the vicinity of stainless steel in the presence of an electrolyte, such as moisture.

To protect the carbon steel it has been the practice to coat stainless steel with a non-ferrous sacrificial metal which is electrochemically anodic to mild carbon steel prior to forming the stainless into trim members. The sacrificial metal is applied to those sections which will eventually contact the automotive body; i.e., the return flange of the fabricated trim members. This generally encompasses the bonding of sacrificial metal to the upper planar surfaces of stainless substrates along or close to their edges and at regular intervals thereacross thereby producing stripes of sacrificial metal at each edge and across the surface. The stripes across the substrate surface appear in pairs at each regular interval with the stripes of each pair being adjacent or close to each other. Cutters subsequently slit the substrate between the stripes of each pair so as to produce strips of stainless steel of a desired width with sacrificial stripes at or close to each edge, suitable for fabrication into automotive trim members.

A particularly good method and apparatus for bonding a plurality of spaced apart stripes to a substrate is described in U.S. Pat. application, Ser. No. 824,205, filed on May 13, 1969, and hereinafter referred to as the copending application. The method and apparatus described therein, however, may get bogged down if the substrate laterally moves from side to side. Lateral movement of the substrate causes improper placement of the striping material and results in a subpar product or in a very slow slitting operation.

The method and apparatus of the present invention avoids the foregoing difficulty by assuring accurate alignment of the striping material regardless of any lateral movement. My invention employs striping material guides which laterally move from side to side with the substrate, thereby, insuring proper alignment of the striping material on the substrate.

It is accordingly an object of this invention to provide apparatus for roll pressure bonding a plurality of spaced apart aligned stripes to a substrate.

It is a further object of this invention to provide a method for roll pressure bonding a plurality of spaced-apart aligned stripes to a substrate.

The foregoing and other objects of the invention will be best understood from the following description, reference being had to the accompanying drawings wherein.

Since a primary use for the invention is the manufacture of sacrificial coated stainless steel automotive trim, the following discussions and examples are directed to this embodiment. As pointed out earlier, the sacrificial metal is one which is anodic to mild carbon steel. Typical sacrificial metals are aluminum, zinc, cadmium, magnesium and base alloys and mixtures thereof. These metals can be supplied in a wide variety of forms including wire and foil. At the present time aluminum wire is preferred.

Figure 1:
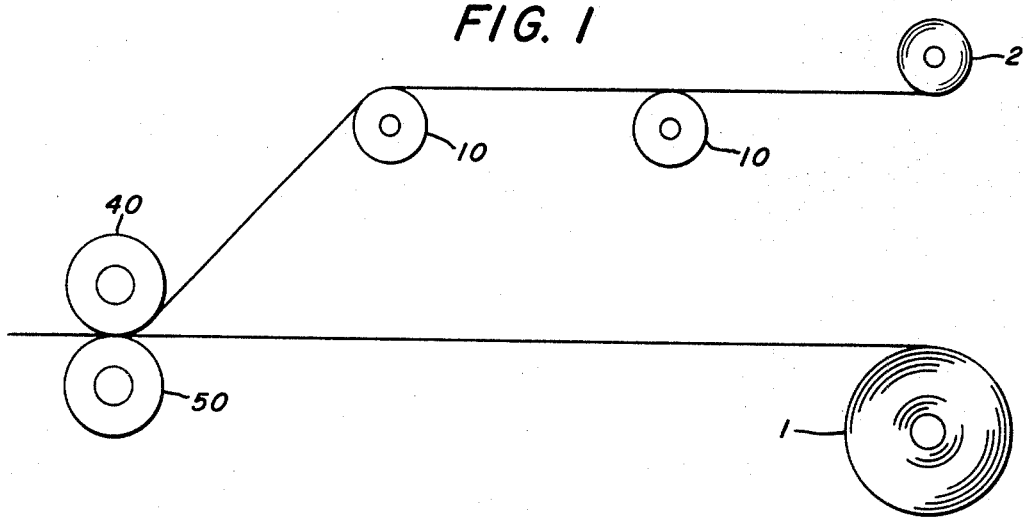
FIG. 1 is a schematic side view of roll pressure bonding apparatus.

FIG. 1 is a schematic side view of roll pressure bonding apparatus. It comprises a coil 1 of stainless steel, adapted to be supplied from any conventional uncoiler, a plurality of spools 2 of aluminum (only one of which is shown), also adapted to be supplied by suitable uncoiling means, first and second guide means 10 for the wire, an upper work roll 40 and a lower work roll 50 for applying sufficient pressure to effect bonding between each of the plurality of spaced-apart widths of aluminum striping material and the stainless steel substrate material. Not shown are heating means which may be necessary to effect the formation of a desired bond, means for receiving the roll bonded material and means for slitting the substrate so as to produce strips of stainless steel of a desired width with sacrificial stripes at or close to each edge, suitable for fabrication into automotive trim members. Heating and slitting means are, however, not necessary parts of the invention. The invention is applicable to the formation of cold pressure bonds and to the formation of roll bonded substrates which are slit at some subsequent time; e.g., in the plant of a fabricator.

Figure 4:
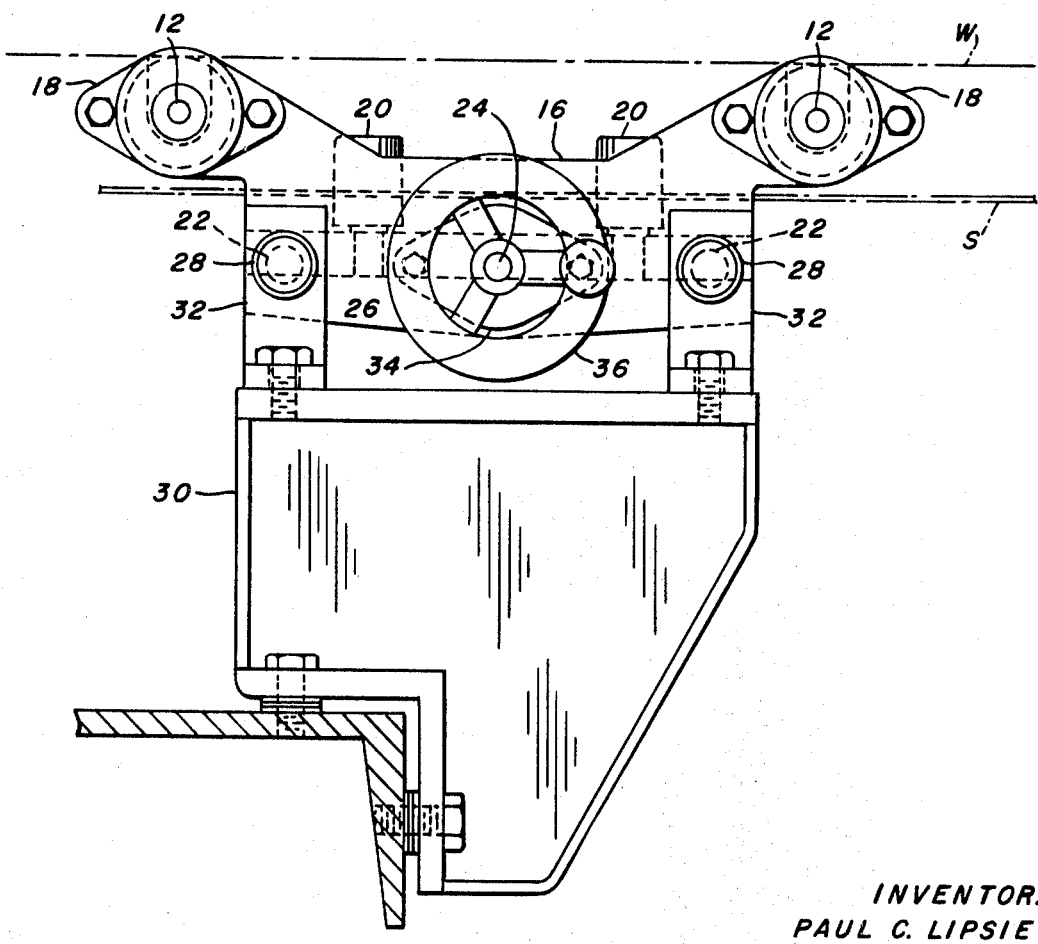
FIG. 4 is a side view of the mechanism which insures proper alignment of the striping material during roll pressure bonding.
Figure 2:
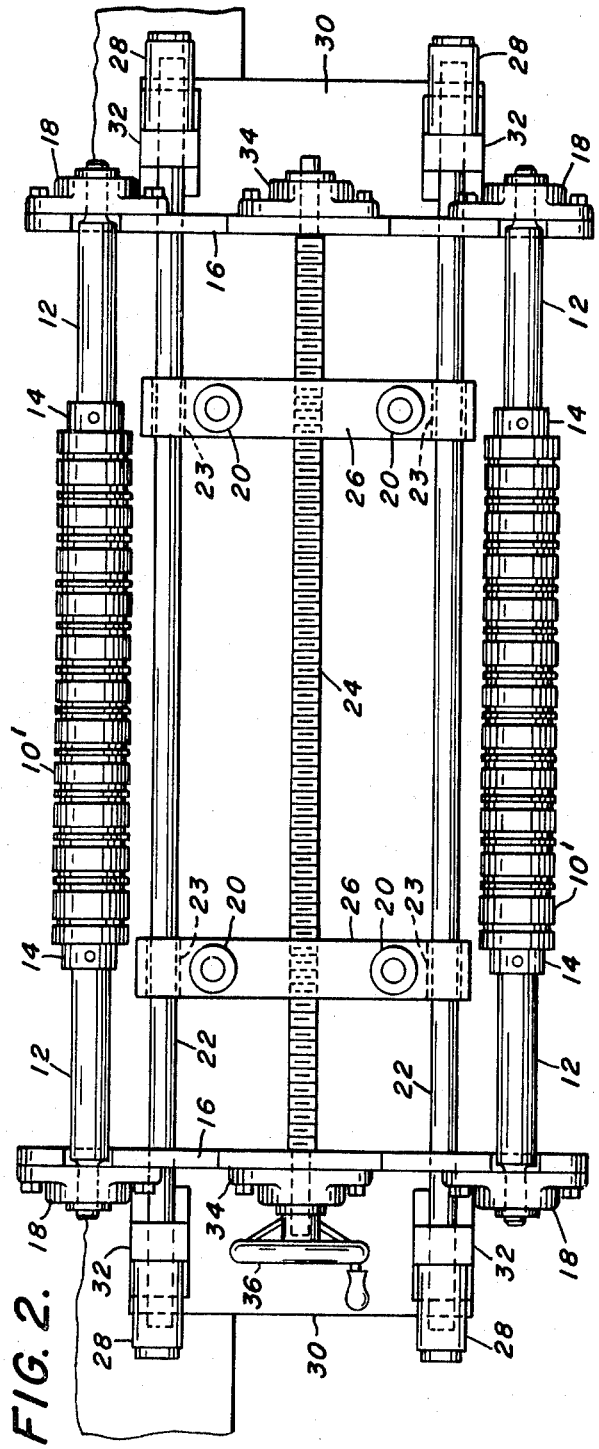
FIG. 2 is a top view of the mechanism which insures proper alignment of the striping material during roll pressure bonding.
Figure 3:
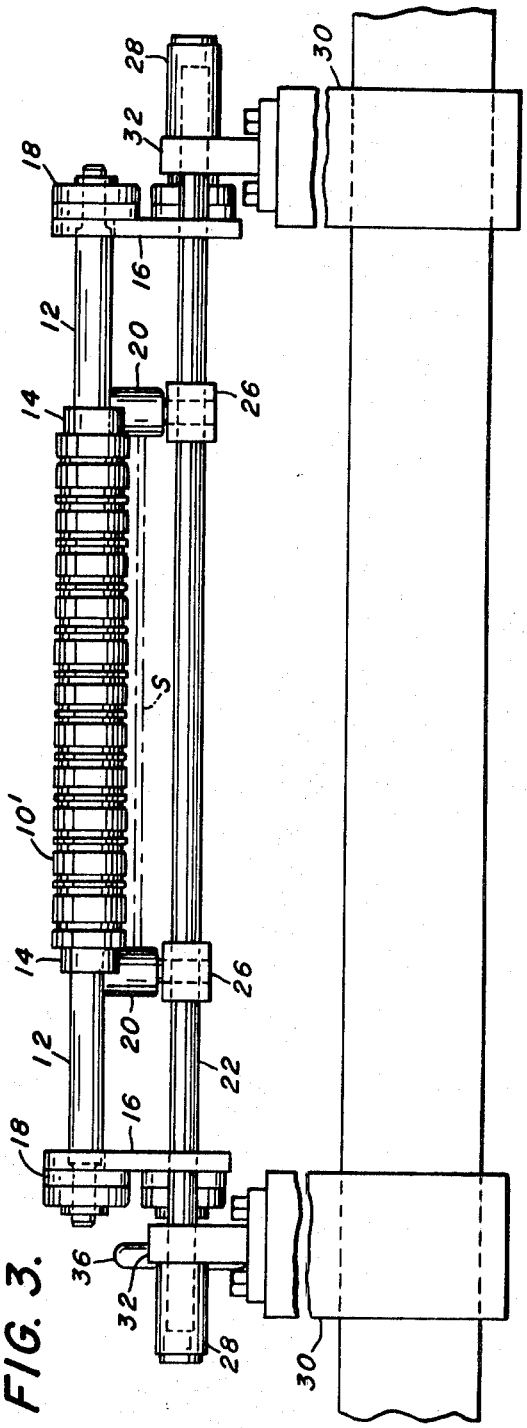
FIG. 3 is a front view of the mechanism which insures proper alignment of the striping material during roll pressure bonding.

FIGS. 2, 3 and 4 respectively show top, front and side view of a particular embodiment of the mechanism which insures proper alignment of the striping material during roll pressure bonding. FIG. 2 comprises indexed roll guides 10', shafts 12, set collars 14 connecting indexed roll guides 10' to shafts 12, floating frames 16, bearing mounts 18 supporting shafts 12 and connected to floating frames 16, edge trailers 20, slidable shafts 22, connected to floating frames 16, bushings 23, adjusting screw 24, support frames 26 for supporting edge trailers 20, for connecting edge trailers 20 to slidable shafts 22 through bushings 23 and for connecting edge trailers 20 to adjusting screw 24, bearing housings 28 which support and contain slidable shafts 22, permanent frame 30, support plates 32 (FIG. 3) for connecting bearing housings 28 to permanent frame 30, mounts 34 for attaching adjusting screw 24 to floating frames 16 and hand wheel 36 for adjusting the spacing between edge trailers 20 through support frames 26. FIGS. 3 and 4 show front and side views of a number of the parts referred to in the description of FIG. 2. In addition, FIG. 3 shows the substrate pass line S and FIG. 4 shows both the substrate pass line S and the striping material pass line W.

Modifications and changes of the structure depicted in FIGS. 2 through 4 are within the scope of this invention. For example, FIGS. 2 through 4 show the employment of two indexed guide rolls, four edge trailers and two slidable shafts whereas any number of guides, edge trailers and slidable shafts can be used. Furthermore, it is within the scope of this invention to replace the edge trailers with electronic edge detectors.

Placing the apparatus as shown in FIGS. 1 through 4 into operation is as follows. Spools of aluminum wire are placed in position as is a coil of stainless steel. The aluminum wires are then threaded over first and second indexed roll guides 10' and between upper work roll 40 and lower work roll 50. At the same time, the stainless steel is passed between the edge trailers 20 and between the upper work roll 40 and lower work roll 50. The edge trailers are adjusted to be a predetermined distance apart. The aluminum wires and stainless steel are subsequently placed on a coiler. A slitting operation can, however, be interposed between bonding and coiling. Power is then supplied to drive the coiler which acts as the driving force withdrawing stainless steel sheets through the work rolls with spaced apart aligned stripes of aluminum bonded thereto. As an alternative, one or more work rolls may be driven instead of the coiler. In addition, the stainless steel and/or aluminum can be heated somewhere along the path between their respective coil and spools and the work rolls, so as to effect the formation of a desired bond.

Proper alignment of the aluminum onto the stainless steel is accomplished through the mechanism described above in the description of FIGS. 2 through 4. Any lateral displacement of the stainless substrate S is followed by edge trailers 20. This movement is then conveyed to indexed roll guides 10' through support frames 26, bushings 23, slidable shafts 22, floating frames 16 and shafts 12. The conveyed motion causes indexed roll guides 10' to move substantially the same distance in substantially the same direction as did substrate S, thereby, maintaining proper alignment between the aluminum wires W and the substrate S.

It will be apparent to those skilled in the art that the novel principles of the invention disclosed herein in connection with specific examples thereof, will suggest various other modifications and applications of the same. It is accordingly desired that in construing the breadth of the appended claims they shall not be limited to the specific examples of the invention described herein.

I claim:

1. Apparatus for roll pressure bonding a plurality of stripes having spaced-apart aligned widths to a substrate having a width at least equal to the combined widths and spacings of said stripes which comprises: means for supplying a plurality of spaced-apart widths of striping material; means for supplying a substrate having a width at least equal to the combined widths and spacings of said stripes; roll pressure bonding means; edge detecting means to detect lateral displacement of said substrate; plural guiding means spaced from one another and located at two predetermined distances from said roll pressure bonding means and jointly movable, said edge detection means adapted to maintain the alignment and spacing of each of said plurality of spaced-apart widths of striping material and to guide them in said maintained alignment to said roll pressure bonding means aligning means operatively associated with said edge detecting means and said plural movable guiding means and adapted, upon detection of lateral displacement of said substrate by said detection means to simultaneously, with said detection, cause movement of said plural guiding means to institute and maintain a predetermined alignment of the combined widths and aligned spacings of said stripes with the substrate width prior to pressure bonding of said stripes and substrate by said roll pressure bonding means; and means for receiving said roll bonded material.

2. Apparatus according to claim 1 wherein said edge detecting means comprises edge trailing means which follow said lateral displacement of said substrate.

3. Apparatus according to claim 2 wherein said edge trailing means is mechanically connected to said guiding and aligning means.

4. Apparatus according to claim 1 wherein said edge detecting means is adjustable to accommodate substrates of different widths.

5. Apparatus according to claim 1 wherein said guiding means comprises at least one indexed roll.

6. Apparatus according to claim 1 wherein said edge detecting means comprises a plurality of edge trailing means located on each side of said substrate for following said lateral displacement of said substrate, and wherein said guiding means comprises a plurality of indexed rolls which are mechanically connected through said aligning means to said plurality of edge trailing means.

7. Apparatus according to claim 1 including means for slitting the roll bonded substrate into strips of desired width.

8. Apparatus according to claim 1 wherein said edge detection means are spaced from said roll pressure bonding means a predetermined distance which is intermediate said predetermined distances that said guiding means are located from said roll pressure bonding means.

9. A method for roll pressure bonding a plurality of spaced-apart stripes having a combined width of spacings and individual widths to a substrate width to effect a predetermined alignment between said combined width and said substrate width which comprises: supplying a width of substrate; supplying a plurality of spaced-apart widths of striping material; passing said substrate width to a roll pressure bonder; guiding said plurality of spaced-apart widths of striping material to said roll pressure bonder at plural spaced locations at predetermined distances from said roll pressure bonder while maintaining the spacing between individual widths of said striping material; detecting lateral displacement of said substrate; aligning the combined width of said stripes with the substrate width by moving said guiding means to effect a predetermined alignment between said striping combined width and said substrate in response to and simultaneous with said detection of lateral displacement of said substrate while simultaneously maintaining the spacing between individual widths of said striping material; and passing said aligned substrate and striping material through said roll pressure bonder; said bonder applying sufficient pressure to effect bonding between each of said plurality of spaced-apart widths of striping material and said substrate.

10. A method according to claim 9 wherein the step of detecting said lateral displacement of said substrate is facilitated by passing said substrate against an edge trailer which follows said lateral displacement of said substrate.

11. A method according to claim 9 wherein the step of detecting said lateral displacement of said substrate is facilitated by passing said substrate between a plurality of edge trailers which follow said lateral displacement of said substrate and wherein the steps of guiding and aligning said widths of striping material is facilitated by passing them through a plurality of indexed rolls which are mechanically connected to said edge trailers.

12. A method according to claim 11 including the step of adjusting the spacing between said edge trailers located on opposite sides of said substrate.

13. A method according to claim 9 and further including the step of slitting the roll bonded substrate into strips of desired widths.

14. A method according to claim 9 wherein lateral displacement of said substrate is detected at a predetermined distance from said roll bonder which is intermediate said locations at which said plurality of spaced-apart widths of striping material are guided to said roll pressure bonder.

15. A method according to claim 9 wherein said substrate and said striping material are metallic.

16. A method according to claim 15 wherein said substrate is a stainless steel substrate.

17. A method according to claim 15 wherein said striping material is from the group consisting of aluminum, zinc, cadmium magnesium and base alloys and mixtures thereof.

18. A method according to claim 15 wherein said substrate is a stainless steel substrate and wherein said striping material is aluminum.

* * * * *